(12) United States Patent
Halpin et al.

(10) Patent No.: US 9,785,768 B1
(45) Date of Patent: Oct. 10, 2017

(54) SYSTEM AND METHOD TO DETER SOFTWARE TAMPERING USING INTERLINKED SUB-PROCESSES

(71) Applicant: Lockheed Martin Corporation, Bethesda, MD (US)

(72) Inventors: John D. Halpin, Delran, NJ (US); Joseph P. Russell, Magnolia, NJ (US); Scott M. Sobieski, West Deptford, NJ (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 4 days.

(21) Appl. No.: 14/623,205

(22) Filed: Feb. 16, 2015

Related U.S. Application Data

(63) Continuation of application No. 10/483,747, filed on Aug. 30, 2004, now Pat. No. 8,959,636.

(51) Int. Cl.
*G06F 21/55* (2013.01)
*G06F 21/54* (2013.01)
*H04L 12/861* (2013.01)

(52) U.S. Cl.
CPC .............. *G06F 21/54* (2013.01); *G06F 21/55* (2013.01); *G06F 2221/033* (2013.01); *H04L 49/9031* (2013.01)

(58) Field of Classification Search
CPC .. G06F 11/3089; G06F 11/3096; G06F 21/82; G06F 12/02; G06F 12/04; G06F 12/06
USPC .............. 711/105, 202, 203; 726/22; 703/2; 705/7.15, 7.27
See application file for complete search history.

(56) References Cited

U.S. PATENT DOCUMENTS

| | | | |
|---|---|---|---|
| 5,144,660 A | 9/1992 | Rose | |
| 5,475,839 A | 12/1995 | Watson et al. | |
| 5,598,531 A | 1/1997 | Hill | |
| 6,091,835 A * | 7/2000 | Smithies | G06K 9/00154 340/5.86 |
| 6,272,533 B1 * | 8/2001 | Browne | G06F 21/82 709/213 |
| 6,463,527 B1 * | 10/2002 | Vishkin | G06F 9/3009 712/219 |
| 6,493,834 B1 * | 12/2002 | Bates | G06F 11/3664 714/35 |

(Continued)

FOREIGN PATENT DOCUMENTS

WO    WO02/079997 A1    10/2002

OTHER PUBLICATIONS

Bohra et.al, Remote Repair of Operating System State Using Backdoors, Feb. 2004, IEEE, all.*

*Primary Examiner* — Brian F Shaw
*Assistant Examiner* — William B Jones
(74) *Attorney, Agent, or Firm* — Howard IP Law Group, P.C.

(57) ABSTRACT

A method is disclosed for deterring the reverse engineering of computer software code. The method involves the recognition of an unauthorized access attempt by one of a plurality of linked sub-processes embedded in the computer software code. In response to the unauthorized attempt, each of the sub-processes begins a recursive execution, resulting in computer system resources being increasingly diverted to the linked sub-processes, making it difficult to continue unauthorized attempts to access the computer software code.

19 Claims, 2 Drawing Sheets

(56) References Cited

U.S. PATENT DOCUMENTS

2007/0266435 A1* 11/2007 Williams ............... G06F 21/54
726/22

* cited by examiner

SYSTEM AND METHOD TO DETER SOFTWARE TAMPERING USING INTERLINKED SUB-PROCESSES

RELATED APPLICATION

This application is a continuation application of U.S. patent application Ser. No. 10/483,747 entitled METHOD TO DETER SOFTWARE TAMPERING USING INTERLINKED SUB-PROCESSES filed Aug. 30, 2004, which will issue as U.S. Pat. No. 8,959,636, on Feb. 17, 2015, the entire contents of which are herein incorporated by reference for all purposes.

FIELD OF THE INVENTION

The present invention relates to software tampering deterrence methods, and more particularly to initiating linked sub-processes in response to an unauthorized access of computer software code.

BACKGROUND

Anti-tamper techniques are widely needed to protect software against tampering events. These techniques can protect valuable intellectual property resident in the code and can also satisfy the Department of Defense Anti-Tamper requirements. The Department of Defense is interested in protecting critical information associated with software applications or weapon systems from exploitation by foreign adversaries. In the commercial world, there are major incentives to develop methods for protecting software applications and other digital media from piracy. Without protection, computer software code is susceptible to attack from malicious users.

There are techniques currently available to prevent tampering or reverse engineering of computer software code. Reverse engineering typically utilizes debugger or other software analysis tools. Prevention of the use of these tools is paramount in deterring unauthorized access. These techniques are generally associated with software protection that utilizes passive schemes, such as encryption or obfuscation. These passive techniques do not prevent the use of malicious tools. Furthermore, these passive techniques can oftentimes be overcome through lengthy, time-consuming processes that can break through the encryption or obfuscation and gain access to the computer software code.

Accordingly, there is a need for anti-tamper techniques that can prevent the use of tools that can facilitate unauthorized access of computer software code.

BRIEF DESCRIPTION OF THE DRAWINGS

A more complete understanding of the present invention may be obtained from consideration of the following description in conjunction with the drawings in which.

SUMMARY

An embodiment of the present invention teaches a method to deter reverse engineering of computer software code. A disclosed technique changes the operating characteristics of the computer system attempting access. Importantly, by executing the linked sub-processes in response to an unauthorized access attempt, it is possible to exhaust all free memory of the computer system, thereby increasing the likelihood that the tamper attempt is unsuccessful.

In an exemplary embodiment of the present invention, a plurality of sub-processes are inter-linked in the computer software code on a computer system. When an unauthorized access of the computer software code is attempted, the linked sub-processes detect the attempt and initiate a response by recursively executing all of the linked sub-processes. By executing all of the sub-processes in recursive fashion, computer system resources such as memory and processing power are increasingly diverted to the linked sub-processes, making it difficult to continue unauthorized attempts to access the computer software code.

Advantageously, the present invention also minimizes the impact on execution time line by avoiding the encryption/decryption such that the computer software code will operate more efficiently in a non-hostile environment. The present invention is a versatile and effective means at preventing unauthorized access of computer software code.

DETAILED DESCRIPTION

An exemplary embodiment of the invention is responsive to unauthorized attempts at gaining access to computer software code. Linked sub-processes are embedded in the computer software code to detect attempts and initiate execution of the sub-processes in response. It is because of the linking of sub-processes that all of the sub-processes can be executed together in response to the attempt and increasingly divert computer system resources to make continued attempts at access impractical.

Figure 1:
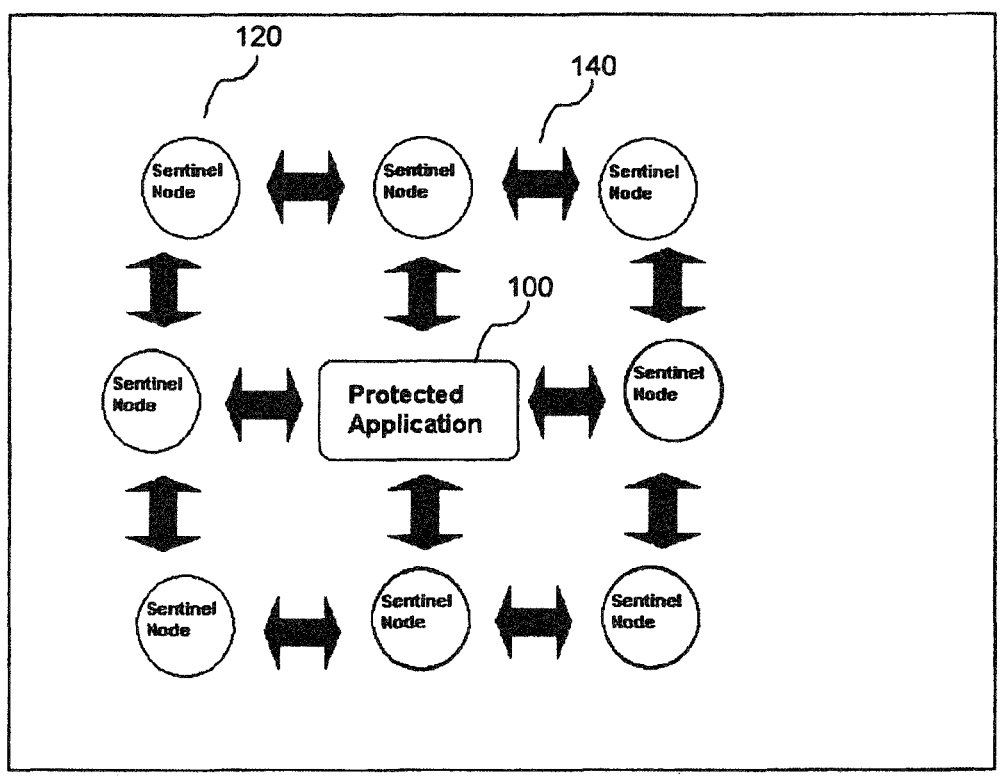
FIG. 1 is a diagram of exemplary linked sub-processes prior to an unauthorized computer software code access attempt.
Figure 2:
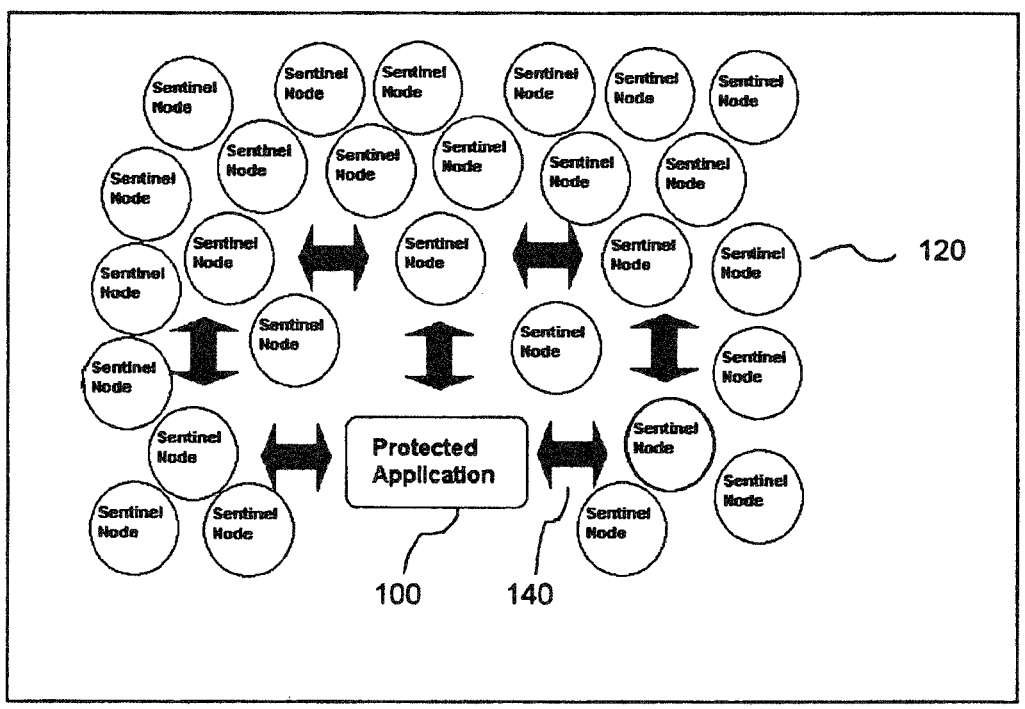
FIG. 2 is a diagram of exemplary linked sub-processes after an unauthorized computer software code access attempt.

An exemplary embodiment can be seen in FIG. 1. A protected application 100 consists of computer software code. Embedded in the protected application 100 are a plurality of sub-processes 120. A typical number of sub-processes 120 is eight as seen in FIG. 1 although the number can be increased depending upon the size of the protected application. Similarly, less can be used from smaller pieces of computer software code. The protected application 100 and the sub-processes 120 are connected through a set of links 140. If one of the sub-processes 120 is removed or altered, the other sub-processes 120 instantiate additional multiple sub-processes in a recursive fashion until all free memory is exhausted. The net result can be seen in FIG. 2 where the recursive execution of the sub-processes results in an increase in sub-processes 120 from eight to 27 in only a few clock cycles of the computer system. With more clock cycles and continued recursive execution, this will quickly exhaust the resources of the computer system and impede the use of any debugger or other software application analysis tools.

Each of the sub-processes or nodes can use a random link or port to communicate with the other nodes via messages on a random interval. Current prototype uses thread-based application spawning to create each sub-process or sentinel. The random message traffic keeps an attacker from being able to gain information by listening to a specific port at a specific time. When this technique is incorporated into a program application, it is injected into the executable at a binary level, with multiple entry points that check to see if the nodes are running and that no attempt to alter the executable has been made by an unauthorized source. The sub-processes or nodes are activated as a part of program startup, with each connecting to the others and verifying that the executable is unaltered.

Each sub-process or node includes a memory payload that can be specified at the time of executable compilation. The number of nodes can be determined based on program specific needs, and each node includes a sensor or series of sensors that allows it to detect when certain conditions are met and alert the program of an attack. When an attack is detected, the triggered node sends a status of its detection to all of the other nodes. Each node (including the detector) then replicates itself, eventually locking the CPU and consuming all available memory. If no attack is detected, the nodes are relatively dormant, requiring a very small percentage of CPU time. Each node can be fitted with binary code designed to crash debuggers and disassemblers, preventing this data from being located. The nodes, through the threads they execute on, will also be able to ignore halt statements from a debugger or operating system, allowing activation while a debugger is running.

This invention is an anti-tamper (AT) technique that will deter someone from reverse engineering a protected piece of software by using multiple sub-processes that are linked together within the body of code. If one of the sub-processes is removed or altered, the other sub-processes initiate additional multiple sub-processes in a recursive fashion until all free memory is exhausted. As the system is deteriorating, the application becomes more erratic which causes each execution to terminate on a different instruction, thus making the task of locating nodes difficult. If a node is located within the application and removed by an attacker, the remaining nodes will still remain active and continue replicating. In order to bypass this protection scheme, all nodes would have to be removed and all entry points would have to be deleted. This is extremely difficult and adds significant delay to the reverse engineering process.

There are limited techniques currently available for protecting software against reverse engineering. The majority of prior art associated with software protection utilizes encryption as a primary method of protection. Encryption can provide an adequate level of protection, but some applications that operate in real-time systems can not accept the impact on the execution time line due to encryption and decryption processes. The present invention, upon detecting a tamper attack, forces an attacker to stop working in the current environment and reboot the system. By running the software protection in the background through sub-process, the impact on program execution is minimized. An exemplary sub-process is a sentinel process that is an executable that examines another executable for undesirable behavior and takes an action. That action can be automatic or a report to an administrator.

Another novel feature of this invention is that it utilizes a self-replicating feature. If a tamper attack is detected, the sentinel process continuously replicates itself until all memory is used up in order to thwart an exploitation attack. Few applications use self-replicating processes; usually self-replication is limited to viruses. A virus is a self-executing process that resides on a system. It rapidly duplicates itself and can destroy data on an infected system. The replication process typically involves inserting binary code within an executable. An example would be that the virus code inserts itself at the beginning of the executable, and marks the first true line of code. It then executes its own instructions and when finished, it returns to the true program. Typically, this is a fast process, allowing the virus to spread without the user being aware of any activity. While some system administration tools use virus-like behavior to repair damaged software, no other real uses of self-replicating executables are known.

By denying a malicious user access to advanced tools, it increases the time it takes to understand and exploit code. The approach embodied by this invention is not obvious in that memory leaks from over instantiation are usually considered a flaw and not a benefit. However, if you factor in the requirement of providing protection to software applications, the utility of the present invention is that an attacker's task is made increasingly more difficult. The impact on execution time line is also minimized by avoiding the encryption and decryption processes. The security issues associated with storing cryptographic keys is also avoided with this technique. Encrypted code is generally protected in a static or non-execution environment. When an executable is activated, the processor uses the encryption algorithm to decode the executable and run it normally. An exploiter can look at the data and analyze the execution of the unencrypted binary and gain an understanding of the flow of execution via debuggers and other tools. An advantage of the present invention is that the image is protected in a run-time environment, preventing dynamic analysis of the application by causing strange behavior and forcing program halts.

The exemplary method for deterring software tampering solves the problem of preventing the use of tools that can be used in reverse engineering computer software code. As such, it has many potential applications where anti-tampering is attempted and can be used in conjunction with other existing techniques to provide more layers of protection. In addition, it can be used when the tampering computer systems are networked. Here, one computer system may be using tools on computer software code resident on another networked computer system. The present invention would then initiate the recursive executions on both computers, making it difficult for each to continue in its efforts. Indeed, any situation where unauthorized access of computer software code is attempted can benefit from the present invention.

It will be understood that the embodiment of the present invention specifically shown and described is merely exemplary and that a person skilled in the art can make alternate embodiments using different configurations and functionally equivalent components. All such alternate embodiments are intended to be included in the scope of this invention as set forth in the following claims.

What is claimed is:

1. A method to deter tampering of software code on a computer system comprising the steps of:

connecting, by a computer hardware processor, a plurality of linked software sub-processes to said software code, each of said plurality of linked software sub-processes configured for detecting an unauthorized access attempt, sending notification of the unauthorized access attempt to all other of the plurality of linked software sub-processes, and replicating itself upon detection or receipt of notification of the unauthorized access attempt;

recognizing, by the computer hardware processor with at least one of said plurality of linked software sub-processes, an unauthorized access attempt of the one of said plurality of linked software sub-processes;

alerting, by the computer hardware processor by the at least one of said plurality of linked software sub-processes recognizing said unauthorized access attempt, other of said plurality of linked software sub-processes of said unauthorized access attempt; and said alerting causing, in response to said unauthorized access attempt, recursive execution by the computer hardware processor of said plurality of linked software sub-processes that replicates said plurality of linked software sub-processes, wherein said replication of said plurality of linked software sub-processes is performed until all free memory in said computer system is exhausted.

2. The method according to claim 1, wherein the recognizing the unauthorized attempt step includes the steps of:
setting a tamper attempt status in said one of a plurality of linked software sub-processes in response to said unauthorized attempt; and
communicating said tamper attempt status to said plurality of linked software sub-processes.

3. The method according to claim 1, further comprising:
communicating from one of said plurality of linked software sub-processes to at least one other of said linked software sub-processes, using a random link or port on a random interval.

4. The method according to claim 1, wherein said plurality of linked software sub-processes are created by thread-based application spawning.

5. The method according to claim 1, further comprising:
injecting, at a binary level at a plurality of entry points, software code for executing each of said plurality of linked software sub-processes into an application executable of software code on said computer system.

6. The method according to claim 5, wherein said plurality of linked software sub-processes are activated as a part of program startup.

7. The method according to claim 1, wherein said recognizing with said plurality of linked software sub-processes an unauthorized attempt to access one of said plurality of linked software sub-processes occurs in a run-time environment.

8. The method according to claim 1, wherein a second computer system is networked to said first computer system; and wherein at least one of said plurality of linked software sub-processes is executed on said first computer system, at least a second of said plurality of linked software sub-processes is executed on said second computer system, and
wherein in response to said recognizing an unauthorized attempt to access one of said plurality of linked software sub-processes, recursive execution of the plurality of linked software sub-processes is initiated on both said first computer system and said second computer system.

9. The method according to claim 1, wherein said plurality of linked software sub-processes are executed without using encryption.

10. A non-transitory computer readable medium for deterring tampering of software code running on a computer system, comprising instructions stored thereon, that when executed by a computer hardware processor perform the steps of:
injecting a plurality of linked software sub-processes into a binary executable of said software code each of said plurality of linked software sub-processes configured for detecting an unauthorized access attempt, sending notification of the unauthorized access attempt to all other of the plurality of linked software sub-processes, and replicating itself upon detection or receipt of notification of the unauthorized access attempt;

recognizing, in at least one of said plurality of linked software sub-processes, an unauthorized access attempt to the at least one of said linked software sub-processes or said software code;
alerting, by the at least one of said linked software sub-processes recognizing said unauthorized access attempt, other linked software sub-processes of said unauthorized access attempt;
and
recursively duplicating each of said plurality of linked software sub-processes, responsive to recognizing said unauthorized attempt to access one of said linked software sub-processes or said software code and said alerting of the other linked software sub-processes of said unauthorized access attempt.

11. The non-transitory computer readable medium of claim 10, further comprising instructions stored thereon, that when executed by the computer hardware processor perform the steps of:
generating at least one message in at least one of said plurality of linked software sub-processes;
transmitting said at least one message to another of said plurality of linked software sub-processes from a randomly selected port at a random time interval.

12. The non-transitory computer readable medium of claim 10, further comprising instructions stored thereon, that when executed by the computer hardware processor, perform the steps of recursively duplicating each of said plurality of linked software sub-processes by:
instantiating multiple additional linked software sub-processes, wherein each additional linked software sub-process is instantiated on a separate processing thread.

13. The non-transitory computer readable medium of claim 12, further comprising instructions stored thereon, that when executed by the computer hardware processor, perform the step of:
configuring each separate processing thread to ignore a halt command from a debugger application or an operating system.

14. The non-transitory computer readable medium of claim 10, further comprising instructions stored thereon, that when executed by the computer hardware processor, perform the step of:
allocating a memory payload in each of said plurality of linked software sub-processes.

15. The non-transitory computer readable medium of claim 10, further comprising instructions stored thereon, that when executed by the computer hardware processor, perform the step of:
generating binary software code in each of said plurality of linked software sub-processes, said generated binary software code configured to disrupt a debugger or disassembly application.

16. The non-transitory computer readable medium of claim 10, further comprising instructions stored thereon, that when executed by the computer hardware processor, perform the step of:
instantiating said plurality of linked software sub-processes during runtime of said software code at startup.

17. The non-transitory computer readable medium of claim 10, further comprising instructions stored thereon, that when executed by the computer hardware processor, perform the step of:
configuring each linked software sub-process as a sentinel process, wherein said sentinel process is configured to examine each other linked software sub-process and said binary executable for conditions indicative of undesirable behavior.

18. The non-transitory computer readable medium of claim 10, further comprising instructions stored thereon, that when executed by the computer hardware processor, perform the steps of:

recursively duplicating each of said plurality of linked software sub-processes until all free memory of said computer system is exhausted.

19. A computer system for preventing tampering or reverse engineering of protected software code, the computer system comprising:

a computer hardware processor; and a memory, said memory having instructions stored thereon, that when executed by said computer hardware processor, perform the steps of:

injecting a plurality of linked software sub-processes into a binary executable of said protected software code at multiple entry points, each of said plurality of linked software sub-processes configured for detecting an unauthorized access attempt, sending notification of the unauthorized access attempt to all other of the plurality of linked software sub-processes, and replicating itself upon detection or receipt of notification of the unauthorized access attempt;

detecting, by one or more of said plurality of linked software sub-processes, an unauthorized access attempt of said protected software code;

alerting by the one of said linked software sub-processes detecting said unauthorized access attempt, other linked software sub-processes of said unauthorized access attempt of said protected computer code; and initiating recursive replication of each of said plurality of linked software sub-processes response to receiving said alert indicating said unauthorized access attempt of said protected software code.

* * * * *